Dec. 3, 1968   G. A. PETERSEN   3,413,740
FRICTIONAL RETAINER FOR EXCAVATOR TOOTH KEY
Filed Dec. 20, 1965
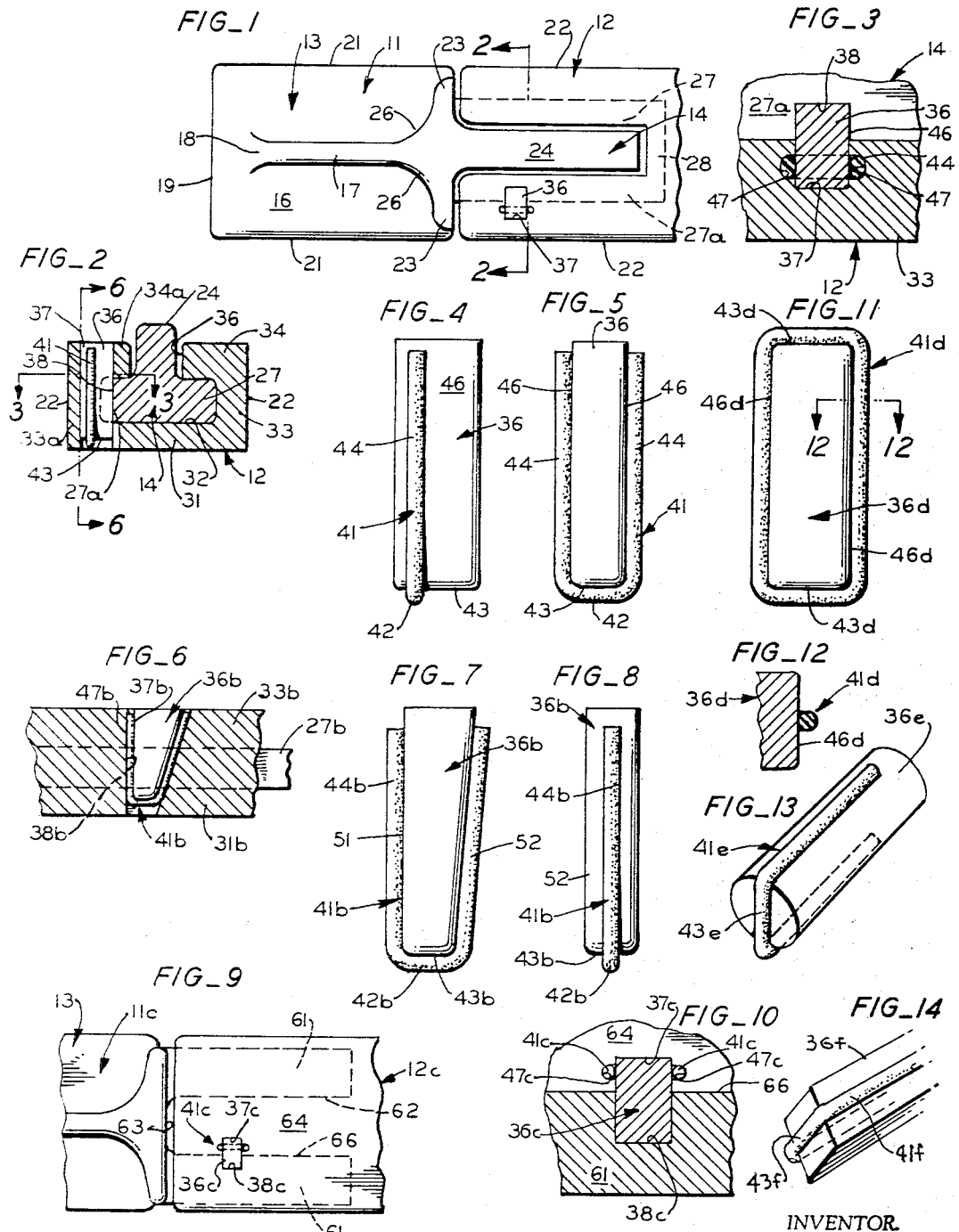
INVENTOR.
GERALD A. PETERSEN
BY
Julian Caplan
ATTORNEY United States Patent Office 3,413,740
Patented Dec. 3, 1968

3,413,740
FRICTIONAL RETAINER FOR
EXCAVATOR TOOTH KEY
Gerald A. Petersen, Sunnyvale, Calif., assignor of
one-half to Anita E. Petersen, Saratoga, Calif.
Continuation-in-part of application Ser. No. 485,154,
Sept. 7, 1965. This application Dec. 20, 1965, Ser.
No. 515,255
3 Claims. (Cl. 37—142)

ABSTRACT OF THE DISCLOSURE

A key passes through aligned holes in a tooth-holder and fits into a notch in the tooth, thereby restraining withdrawal of the tooth from the holder. To prevent the key from being jarred loose, a rubber loop extends around the key and frictionally engages walls of the holder and of the tooth.

---

This invention is a continuation-in-part of copending application Ser. No. 485,154, now Patent No. 3,349,508, filed Sept. 7, 1965, and relates to a frictional retainer for excavator tooth key.

Excavating equipment, of which a typical example is a dipper bucket, employs replaceable teeth formed to mate with tooth-holders which are either integral with or fastened to the bucket or other portion of the equipment. As a tooth becomes worn, it is necessary to disengage it from its tooth-holder for replacement, sharpening, or repair, and the art has developed various means for holding a detachable tooth and for retaining the tooth in place against unintentional dislodgment. The present invention comprises an improvement on such means. Thus in the prior art, one means for a retaining tooth in place is the use of a key inserted through an aperture in the tooth-holder and passing through an aligned notch or hole in the tooth. The key restrains withdrawal of the tooth relative to the holder. Such a key may be of various cross-sectional shapes and may be straight or tapered and this invention contemplates use of various shapes of keys. Because of the severe operating conditions to which excavating teeth are subjected, repeated stresses may cause the key to be dislodged with consequent unintentional separation of the tooth and holder. The present invention comprises a means for restraining dislodgement of the key.

More specifically, the present invention provides a retainer of rubber or rubber substitute, which is compressed between the key and adjacent wall of the apertures or notches in the tooth and/or holder through which the key passes. The rubber frictionally restrains unintentional dislodgement of the key. However, when it is necessary to remove the tooth the key may be driven out of its socket by means of a hammer or prying instrument against the resistance of the retainer.

In a preferred form of the invention, the retainer heretofore described is a length of circular cross-sectional rubber or rubber-like material which is bent in a U-shape passing around at least two sides and one end of the key. When the key is driven into the socket, the entering end of the key forces the center of the U-shaped portion down into the socket, pulling the legs of the U-shaped portion along with the key. The legs are then compressed between the key and adjacent walls and restrain withdrawal of the key.

In a further preferred form of the invention, shallow grooves may be formed in the wall of the socket facing the key, the depth of such grooves being less than the initial cross-sectional shape of the rubber. Hence the rubber is compressed between the bottom of the groove and the adjacent face of the key. Deformation of the rubber in this manner enhances the frictional resistance to withdrawal of the key and makes for more effective retention. Further, the construction heretofore described accommodates variations in dimensions of the parts.

Bending the retainer as heretofore described insures that it is not pulled out of position, since the tension on each of the two legs is approximately the same.

In another preferred form of the invention the retainer is in the form of a closed loop, such as an O-ring. The ring fits over each end and along opposite sides of the key.

Although straight and tapered keys of rectangular cross-section have been most commonly used in the excavating tooth art, the present invention is also used with keys of other cross-sections, such as round, oval or diamond-shape.

In one form of the present invention, the rubber may be fused, vulcanized, or cemented to the key. However, such permanent attachment of the rubber to the key is not necessary since long lengths of rubber may be stocked by the users of excavating equipment and individual lengths of proper size cut from a coil of rubber as required.

The present invention is usable with a wide variety of excavating equipment. Various manufacturers use different configurations of the proximal portions of the teeth and the mating portions of the tooth-holder. Two such shapes are hereinafter described in detail and the invention is particularly useful with such designs. However, the invention has wider applicability to numerous other shapes employing transverse keys.

Other objects of the present invention will become apparent upon reading the following specification and referring to the accompanying drawings in which similar characters of reference represent corresponding parts in each of the several views.

In the drawings:

FIG. 1 is a fragmentary top plan view of portion of a tooth and tooth-holder, in accordance with this invention.

FIG. 2 is a sectional view taken substantially along the line 2—2 of FIG. 1.

FIG. 3 is an enlarged fragmentary sectional view of a portion of the structure taken substantially along the line 3—3 of FIG. 2.

FIG. 4 is a side elevational view of one form of key, in accordance with the invention.

FIG. 5 is an end elevation of the strutcure of FIG. 4.

FIG. 6 is a sectional view of a modification employing a tapered key, the line of the section being indicated by line 6—6 of FIG. 2.

FIGS. 7 and 8 are, respectively, similar to FIGS. 4 and 5 of the tapered modification.

FIG. 9 is a view similar to FIG. 1, showing the invention applied to a different form of tooth and tooth-holder.

FIG. 10 is a view similar to FIG. 3 of the modification of FIG. 9.

FIG. 11 is a view similar to FIG. 5 of a modified retainer.

FIG. 12 is an enlarged fragmentary sectional view taken substantially along line 12—12 of FIG. 11.

FIGS. 13 and 14 are fragmentary perspective views of two further modified keys.

Tooth 11 and tooth-holder 12, shown in FIGS. 1 to 3, are similar in many respects to those corresponding elements shown in said Ser. No. 485,154. Tooth 11 has a distal portion 13 and proximal portion 14. Distal portion 13 is subject to considerable variation. In the form herein shown, there are outwardly converging top and bottom surfaces 16 and the top surface is formed with a medial longitudinal rib 17, which slants downward-forward toward top surface 16 and merges therein at a terminus 18, spaced rearward from the blunt transverse perpendicular forward end 19 of the tooth. The side edges 21 of distal portion are vertical and parallel and are spaced apart approximately the same distance as the sides 22 of holder 12.

Immediately forwardly of holder 12 are laterally extending protuberances 23 on either side of the rearward end of longitudinal rib 17 which, in effect, comprise a transverse rib. Protuberances 23 have an elevation at least as high as rib 17 and the top edge of rib 24 of proximal portion 14. Corners 26 where rib 17 and protuberances 23 coincide are rounded and filleted to direct dirt dug by the front cutting edge 19 sidewardly. Protuberances 23 limit inward movement of the tooth relative to holder 12 and insure that the tooth seats against the front end of the holder and not at the back of the holder. Although this feature of the invention is optional, nevertheless it avoids undue strain at the point where the front of the holder and tooth coincide, and in the event of the corner of the tooth hitting a rock or other hard object with great force might cause a fracture or dislodgment of the tooth.

Proximal portion 14 of tooth 11 is of an inverted T-shape in cross-section and narrower than the distal portion. It has an upwardly extending rib 24 and laterally projecting legs 27a on opposite sides and below rib 24. Legs 27, 27a extend in a rearward extension 28 behind the rearward end of rib 24. Extension 28 enhances the stability of the tooth in its holder. The elevation of rib 24 relative to the top of holder 12 is subject to considerable variation, as is explained in Serial No. 485,154.

Holder 12 has a forward opening socket complementary to the cross-section of the proximal portion 14 of tooth 11. Thus holder 11 has a bottom 31, having a bottom wall 32 against which the bottoms of legs 27 rest, and also sides 33, 33a and overhanging lips 34, 34a separated by a longitudinal vertical slot 36 in the top of holder 12 through which rib 24 projects.

Installation and removal of tooth 11 from holder 12 results in the proximal portion 14 sliding in the recess in holder 12.

The retention means shown in FIGS. 1 to 5 comprises a key 36, which is straight and rectangular in shape. A rectangular aperture 37 is cut in holder 12, intersecting leg 27a and a rectangular notch 38 is formed in leg 27a. Thus when key 36 is driven into aperture 37, it also enters into notch 38 and hence locks the tooth in the holder. The disadvantage of metal keys of the type thus described has heretofore been that they tend to be dislodged by vibration and other forces. Various means for retaining the keys in their holes have been proposed, but such means have been unsatisfactory in the sense that they are either ineffective or make installation and removal time-consuming.

In accordance with a preferred form of the present invention, a length of circular cross-section rubber 41 is used. A synthetic rubber material, such as neoprene or other synthetic material may be used, certain of such synthetics being particularly useful where high temperatures are encountered. Preferably, the rubber length 41 is bent in U-shape, as best shown in FIG. 5, the bottom stretch 42 underlying the bottom end 43 of key 36 and sides 44 extending up along sides 46 of the key. Rubber 41 may be cut in the field from a coil, kept by the user for such purpose, or it may be fused, vulcanized or cemented in various ways to key 36. To accommodate rubber 41, shallow grooves 47 may be formed in walls of aperture 37, preferably of a depth less than the initial cross-sectional area of rubber 41 so that the rubber is deformed and compressed, augumenting frictional resistance to withdrawal of the key from its socket. Such deformation of the rubber also accommodates minor variations in dimensions of the parts.

The key is installed by bending the rubber to the shape best shown in FIGS. 4 and 5 and then inserting the lower end 43 of key 36 in the aperture 37 and driving the same down until it assumes the position best shown in FIG. 2. The key enters and fills the notch 38. The key normally remains in place against unintentional dislodgment despite considerable vibration and other stresses tending to separate the members. When it is necessary to remove tooth 11, an instrument may be inserted through the bottom of hole 37, driving the bottom end 43 upwardly against the frictional resistance of rubber 41 until the key clears notch 38, permitting tooth 11 to be slid out of holder 12 longitudinally. The modification of FIGS. 6 to 8 resembles that heretofore described, except that key 36b is tapered and the hole 37b and notch 38b are similarly tapered. Thus one edge 51 of key 36b is straight, while the opposite edge 52 is tapered. Rubber 41b extends around edges 51, 52 and bottom 43b in stretches 44b, 42b.

In use in the modification of FIGS. 6 to 8, tapered key 36b when driven into holes 37b and notch 38b draws tooth 11 into position with protuberances 23 snug against the forward end of the holder. The rubber retainer 41b functions in a manner similar to that previously described.

The modification of FIGS. 9 and 10 shows the invention applied to a prolonged tooth 11c, similar to that shown in Petersen Patent No. 2,968,880. The distal portion 13c of tooth 11c is subject to wide variation but, as shown in fragmentary form in FIG. 9, resembles the distal portion 13 of FIG. 1. The proximal end of the tooth is divided into two prongs 61, each substantially rectangular in cross-section by means of a rectangular slot 62 which extends forwardly from the rearward end of the tooth, the walls of slot 62 being substantially vertical and parallel and terminating at a front end 63. A web 64 extends from top to bottom of holder 12c, substantially complementary to slot 62. Holder 12c, as viewed from the forward end, is generally of the shape of the letter H turned on its side. This shape is shown in the Petersen patent heretofore mentioned and is now very common in the art. The present invention provides an alternate means for holding the tooth and holder together. Thus a hole 37c is formed in holder 12c through the web 64, hole 37c also overlapping the interface indicated by reference numeral 66, where the wall of web 64 faces the inner wall of slot 62. A notch 38c is formed in a prong 61. Key 36c is similar to that heretofore described and is driven into hole 38c and notch 37c. In shape, key 36c may resemble either that shown in FIGS. 4 and 5, or FIGS. 5 to 7, and the holes and notches 37c, 38c are formed complementary thereto. Similarly, rubber 41c extends around the sides and bottom of key 36c and is compressed within shallow groove 47c, communicating with holes 37c. The rubber 41c retains key 36c in position as in the preceding modification.

It will further be understood that whereas in the accompanying drawings a single key 36 has been shown for each tooth and holder, more than a single key may be used where operating conditions are severe. It will further be understood that although the keys are shown in the accompanying drawings in what are presently deemed to be the most suitable locations, they may be applied in other locations. Thus the keys may extend transversely of the direction shown, or may be located in different areas. Also, as has been stated, the principle of the rubber retainer for the key may be applied to other shapes of teeth and holders.

As shown in FIGS. 11 and 12, instead of an open-ended length of rubber 41 a closed loop 41d may be used, such as an O-ring. Preferably the circumference of ring 41d is slightly less than the periphery of the key 36a so that ring 41d is stretched slightly when slipped over each end 43d and down opposite sides 46d of key 36d.

In FIG. 13, the cross-sectional shape of key 36e is round rather than rectangular. It will be understood that key 36e may be tapered rather than straight and that retainer 41e may be either an open-ended loop (as in FIG. 1) or a ring (as in FIG. 11).

FIG. 14 shows a diamond cross-sectional key 36f with retainer 41f. The remarks applicable to FIG. 13 are likewise applicable here.

Although the foregoing invention has been described in some detail, by way of illustration and example for purposes of clarity of understanding, it is understood that certain changes and modifications may be practiced within the spirit of the invention and scope of the appended claims.

What is claimed is:

1. The combination of a tooth having a distal cutting portion and a proximal portion, a tooth-holder formed with a recess opening forward and shaped to receive said proximal portion, said tooth and holder formed with aligned apertures, said apertures being formed with at least one shallow groove, a rigid elongated key member fitting through said aligned apertures to restrain withdrawal of said tooth from said holder, and a resilient retainer compressed between walls of said apertures and said key member to restrain unintentional withdrawal of said key from position through said apertures, said retainer being partially within said groove and extending longitudinally of said key and engaging walls of said holder and of said tooth.

2. The combination of a tooth having a distal cutting portion and a proximal portion, a tooth-holder formed with a recess opening forward and shaped to receive said proximal portion, said tooth and holder formed with aligned apertures, a rigid elongated key member fitting through said aligned apertures to restrain withdrawal of said tooth from said holder, and a resilient retainer compressed between walls of said apertures and said key member to restrain unintentional withdrawal of said key from position through said apertures, said retainer extending longitudinally of said key and engaging walls of said holder and of said tooth, said proximal portion of said tooth being T-shaped in cross-section, one said aperture comprising a notch in the outer edge of a foot of said T, the other said apertures comprising holes in said holder.

3. The combination of a tooth having a distal cutting portion and a proximal portion, said proximal portion of said tooth being bifurcated in a pair of prongs, each substantially rectangular in cross-section and divided by a longitudinal slot, a tooth-holder formed with a recess opening forward and shaped to receive said proximal portion, said tooth and holder formed with aligned apertures, one said aperture comprising a notch in a wall of said slot, the other said apertures comprising holes in said holder, a rigid elongated key member fitting through said aligned apertures to restrain withdrawal of said tooth from said holder, and a resilient retainer compressed between walls of said apertures and said key member to restrain unintentional withdrawal of said key from position through said apertures, said retainer extending longitudinally of said key and engaging walls of said holder and of said tooth.

References Cited

UNITED STATES PATENTS

| | | | |
|---|---|---|---|
| 1,951,988 | 3/1934 | Mekeel. | |
| 2,222,071 | 11/1940 | Gustafson | 37—142 |
| 2,253,245 | 8/1941 | Noack | 37—142 |
| 2,657,482 | 11/1953 | Launder et al. | |
| 2,982,035 | 5/1961 | Stephenson. | |

ABRAHAM G. STONE, *Primary Examiner.*

A. E. KOPECKI, *Assistant Examiner.*